UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

No. 876,304.  Specification of Letters Patent.  Patented Jan. 7, 1908.

Original application filed September 5, 1906, Serial No. 333,383. Divided and this application filed October 1, 1907. Serial No. 395,423.

*To all whom it may concern:*

Be it known that I, CARLETON ELLIS, a citizen of the United States, and resident of Larchmont, in the county of Westchester and State of New York, have made certain new and useful Inventions Relating to Finish-Removers, of which the following is a specification.

This invention relates to finish removers and relates especially to compositions of matter for the removal of paint, varnish, enamel, or other finish coatings without injury to the underlying surfaces or to the person of the operator, such compositions consisting essentially of an alcoholic or other loosening finish solvent with which a wax or waxy body has been suitably incorporated.

Loosening finish solvents, that is, solvents having a generally alcoholic character or action in removers are very desirable for use in the removal of coatings consisting of shellac or other varnish gums and resins. Shellac, for instance, is very readily soluble in such volatile alcoholic or loosening finish solvents, although it is not soluble in benzol or similar hydrocarbons which decrease this solvent power of the loosening solvents in removers. The loosening finish solvents which are preferably employed in this instance comprise the strict alcohols, such as methyl (wood), ethyl (grain), propyl or other aliphatic or aromatic alcohol possessing neutral solvent properties for such resins or the functional equivalents of the strict alcohols in removers, including acetone, methyl ethyl ketone and other ketones, oil of acetone and also certain aldehydes, ethers and esters, such as amyl acetate, for instance, many of these solvents being used in their cheaper commercial forms, such as denatured grain alcohol, for example. Water soluble aliphatic alcohols seem most desirable for this purpose, particularly wood or grain alcohol in its denatured form, if desirable, although acetone is also very efficient with certain finishes.

The thickening and evaporation retarding material may consist of a wax or waxy body properly incorporated with the finish solvents and may comprise ceresin, Japan wax, beeswax or bayberry wax, although various other waxes are useful with certain loosening solvent material. Ceresin is especially desirable with the preferred loosening finish solvent material because the excess of this waxy material which is not completely dissolved is present in a colloidal or gelatinous mass which has a very desirable thickening action, giving increased consistency to the remover. The composition may preferably be prepared by heating the loosening solvent material with the wax until the latter has melted when the mixture is stirred vigorously and simultaneously cooled as quickly as possible to the room temperature. Other methods of preparation are, of course, possible, such for instance, as melting the wax separately and adding it to the previously warmed alcoholic solvent material. When prepared in this manner, the wax apparently remains to a certain extent in solution in a supersaturated condition in which it is peculiarly effective as a retarder of evaporation, only a small fraction of a percent. of wax being needed for this purpose. The balance of the wax acts largely as a thickener, giving more or less consistency according to the amount present, vertical surfaces generally requiring a heavier bodied composition than horizontal ones and also more wax being preferably employed in warm weather since temperature changes have considerable effect on the physical condition of the wax. A desirable illustrative remover of this character may comprise denatured grain alcohol 85 gallons, oil of acetone 14 gallons, amyl acetate 1 gallon, ceresin wax 5 pounds and Japan wax 10 pounds. Another illustrative remover may comprise acetone 50 gallons, wood alcohol 50 gallons and waxy material, such as beeswax 15 pounds. Another remover may comprise wood alcohol 90 gallons, acetone 10 gallons and ceresin wax 5 pounds, and still another illustrative remover may comprise denatured grain alcohol 100 gallons and ceresin wax 20 pounds.

This invention has been described in this case which is a divisional continuation of Ellis application 333,383, filed September 5, 1906, in connection with a number of illustrative ingredients, relative proportions, and formulas, to the details of which disclosure the invention is not, of course to be limited.

What is claimed is.

1. The finish remover comprising approximately denatured grain alcohol 85 gallons, oil of acetone 14 gallons, amyl acetate 1 gallon with which 10 pounds of Japan wax and 5 pounds of ceresin wax have been incorporated to retard evaporation.

2. The finish remover comprising approximately denatured grain alcohol 85 gallons, ketonic loosening finish solvent material 14 gallons with which 15 pounds of waxy thickening material, including 5 pounds of ceresin wax has been incorporated to retard evaporation.

3. The finish remover comprising approximately alcohol eighty-five gallons, ketonic loosening finish solvent material fourteen gallons with which fifteen pounds of waxy thickening material including ceresin wax have been incorporated.

CARLETON ELLIS.

Witnesses:
JESSIE B. KAY,
HARRY L. DUNCAN.